United States Patent
Nissen et al.

(10) Patent No.: US 10,336,218 B2
(45) Date of Patent: Jul. 2, 2019

(54) HEIGHT ADJUSTING MECHANISM FOR A VEHICLE SEAT, IN PARTICULAR A UTILITY VEHICLE SEAT, AND VEHICLE SEAT, IN PARTICULAR UTILITY VEHICLE SEAT

(71) Applicant: Adient Luxembourg Holding S.á.r.l., Luxembourg (LU)

(72) Inventors: Ruediger Nissen, Freisen-Oberkirchen (DE); Andreas Closset, Rockenhausen (DE)

(73) Assignee: ADIENT LUXEMBOURG HOLDING S.À.R.L., Luxembourg (LU)

( * ) Notice: Subject to any disclaimer, the term of this patent is extended or adjusted under 35 U.S.C. 154(b) by 0 days.

(21) Appl. No.: 15/558,773

(22) PCT Filed: Mar. 7, 2016

(86) PCT No.: PCT/EP2016/054733
§ 371 (c)(1),
(2) Date: Sep. 15, 2017

(87) PCT Pub. No.: WO2016/146412
PCT Pub. Date: Sep. 22, 2016

(65) Prior Publication Data
US 2018/0072192 A1    Mar. 15, 2018

(30) Foreign Application Priority Data

Mar. 18, 2015 (DE) .................. 10 2015 204 919
Jul. 30, 2015 (DE) .................. 10 2015 214 532

(51) Int. Cl.
*B60N 2/16* (2006.01)
*B60N 2/50* (2006.01)
(Continued)

(52) U.S. Cl.
CPC ......... *B60N 2/1665* (2013.01); *B60N 2/0244* (2013.01); *B60N 2/162* (2013.01);
(Continued)

(58) Field of Classification Search
CPC .... B60N 2/1665; B60N 2/0244; B60N 2/162; B60N 2/38; B60N 2/508; B60N 2/525
(Continued)

(56) References Cited

U.S. PATENT DOCUMENTS 4,264,050 A * 4/1981 Wahls ............... B60N 2/501
                                                        248/543
4,645,169 A * 2/1987 Mischer ............ B60N 2/501
                                                        248/550
(Continued)

FOREIGN PATENT DOCUMENTS

CN    102 958 748 A    3/2013
CN    102 971 183 A    3/2013
(Continued)

*Primary Examiner* — Mark R Wendell
(74) *Attorney, Agent, or Firm* — McGlew and Tuttle, P.C.

(57) ABSTRACT

A height adjusting mechanism (100) is provided for a vehicle seat (1), in particular for a utility vehicle seat, including a scissors-type frame (3). The height adjusting mechanism (100) includes a gas spring (12) that cooperates with the scissors-type frame (3) as well as a valve device (40) for ventilating and/or evacuating the gas spring (12). The valve device (40) is located on a control unit (110). The control unit (110) includes a control element (82) for actuating the height adjusting mechanism (100). A vehicle seat (1) is also provided including a height adjusting mechanism (100).

20 Claims, 8 Drawing Sheets

(51) Int. Cl.
*B60N 2/52* (2006.01)
*B60N 2/02* (2006.01)
*B60N 2/38* (2006.01)

(52) U.S. Cl.
CPC ............... *B60N 2/38* (2013.01); *B60N 2/508* (2013.01); *B60N 2/525* (2013.01)

(58) Field of Classification Search
USPC .................................................... 297/344.16
See application file for complete search history.

(56) References Cited

U.S. PATENT DOCUMENTS

| | | | |
|---|---|---|---|
| 5,447,178 A * | 9/1995 | Gabrlik | F16K 11/0655 137/353 |
| 5,533,703 A * | 7/1996 | Grassl | B60N 2/501 248/421 |
| 7,712,836 B2 * | 5/2010 | Deml | B60N 2/501 297/344.12 |
| 9,381,829 B2 * | 7/2016 | Lee | B60N 2/505 |
| 2010/0224846 A1 * | 9/2010 | Viste | B60N 2/501 254/93 VA |
| 2013/0140865 A1 | 6/2013 | Shin | |

FOREIGN PATENT DOCUMENTS

| | | |
|---|---|---|
| CN | 104 129 324 A | 11/2014 |
| DE | 40 13 275 A1 | 10/1990 |
| DE | 10 2008 013 794 B3 | 7/2009 |
| DE | 10 2011 014 234 A1 | 9/2012 |
| EP | 2 570 297 A1 | 3/2013 |
| KR | 2005 0065877 A | 6/2005 |
| WO | 99/65728 A1 | 12/1999 |

* cited by examiner

HEIGHT ADJUSTING MECHANISM FOR A VEHICLE SEAT, IN PARTICULAR A UTILITY VEHICLE SEAT, AND VEHICLE SEAT, IN PARTICULAR UTILITY VEHICLE SEAT

CROSS REFERENCE TO RELATED APPLICATIONS

This application is a U.S. National Phase Application of International Application PCT/EP2016/054733, filed Mar. 7, 2016, and claims the benefit of priority under 35 U.S.C. § 119 of German Applications 10 2015 204 919.1, filed Mar. 18, 2015 and 10 2015 214 532.8, filed Jul. 30, 2015, the entire contents of which are incorporated herein by reference.

FIELD OF THE INVENTION

The invention relates to a height adjusting mechanism for a vehicle seat, in particular utility vehicle seat, wherein the vehicle seat has a scissors-type frame (a scissors frame), and the height adjusting mechanism has a gas spring interacting with the scissors-type frame and a valve device for ventilating and/or venting the gas spring. In addition, the invention relates to a vehicle seat with such a height adjusting mechanism.

BACKGROUND OF THE INVENTION

DE 10 2008 013 794 B3 discloses a vehicle seat, in particular a utility vehicle seat, with a scissors-type frame which is rockable and height-adjustable, with a gas spring and at least one pair of rockers which cross over each other at a scissors axis, and a control device for level control and for height adjustment of the scissors-type frame. The control device comprises a valve device with valves for activating the gas spring, a control link and a sensing member for sensing the control link, wherein the control link and the sensing member are kinematically assigned to different parts of the scissors-type frame which are movable relative to each other. The control link and the valve device are kinematically assigned to a first rocker and the sensing member to a second rocker. The control link is arranged pivotably about a pivot axis and for actuating the valve device. In order to change the height of the scissors-type frame, and therefore the height of the vehicle seat, the sensing member is rotated relative to the scissors axis by means of a cable pull. The sensing member thereby actuates the control link, as a result of which the valve device ventilates or vents the gas spring until the desired height is reached.

The rotation of the sensing member by means of the cable pull can take place by means of a latching switch, as is known, for example, from DE 10 2011 014 234 A1. Said latching switch permits the specification of a desired value and comprises a latching track with a plurality of latches, a lever which is pivotable about an axis, and at least one latching element which, by engagement in a latch, fixes the latching switch in a discrete latching position, wherein the at least one latching element is of spring-like design.

SUMMARY OF THE INVENTION

The invention is based on an object of providing a cost-effective and simply constructed height adjusting mechanism for a vehicle seat, in particular a utility vehicle seat. In particular, the operation of the height adjusting mechanism is intended to be comfortable. In particular, the vehicle seat is intended to be height-adjustable by means of a gas spring. In particular, a level control is intended to be omitted. In particular, as many components as possible of a height adjusting mechanism which is known from the prior art and has level control are intended to be able to be adopted for the construction of the height adjusting mechanism. The components of the height adjusting mechanism are intended to be able to be taken in particular from an assembly kit, wherein the assembly kit has components for constructing the height adjusting mechanism without level control and components for constructing a height adjusting mechanism with level control. In addition, a vehicle seat having a cost-effective and simply constructed height adjusting mechanism is intended to be provided. In particular, a pneumatic utility vehicle seat with simple height adjustment is intended to be realized.

This object is achieved according to the invention by a height adjusting mechanism for a vehicle seat, in particular utility vehicle seat, wherein the vehicle seat has a scissors-type frame, and the height adjusting mechanism has a gas spring interacting with the scissors-type frame and a valve device for ventilating and/or venting the gas spring, wherein the valve device is arranged on an operator control unit, and the operator control unit has an operator control element for actuating the height adjusting mechanism.

Owing to the fact that the valve device is arranged on an operator control unit, and the operator control unit has an operator control element for actuating the height adjusting mechanism, a cost-effective and simply constructed height adjusting mechanism for a vehicle seat, in particular a utility vehicle seat, is provided.

Ventilation is intended to be understood as meaning filling the gas spring with a gaseous medium, in particular air, in particular having a higher pressure than an ambient pressure. Venting is intended to be understood as meaning letting the gaseous medium out of the gas spring.

The valve device can be a part of the operator control unit. The valve device is preferably arranged within the operator control unit. A solution which particularly saves on construction space is thereby created. In addition, the operator control unit is thereby a checkable module. Possible leakage of the valve device can already be established prior to the installation of the operator control unit in the vehicle seat.

The valve device can have a pneumatic valve. The valve device can have a plurality of pneumatic valves, preferably two pneumatic valves. A first pneumatic valve can bring about ventilation of the gas spring. A further, second pneumatic valve can bring about venting of the gas spring. The pneumatic valves can be simple valves known from the prior art, which permits a cost-effective valve device. The valve device preferably has two 2/2-way pneumatic valves. A particularly simple construction of the height adjusting mechanism is provided if actuation of one of the two 2/2-way pneumatic valves brings about ventilation of the gas spring and actuation of the other of the two 2/2-way pneumatic valves brings about venting of the gas spring. The term 2/2-way means that the pneumatic valve has two connections and two possible switching positions.

In an unactuated state of the operator control element, the operator control element is preferably in a neutral position, and the valve unit is blocked. Such a neutral position permits logical handling of the operator control element for the user. For the ventilation, the user actuates the operator control element in a first direction. For the venting, the user actuates the operator control element in a different, second direction.

It is particularly advantageous if the operator control element can be moved out of the neutral position in precisely two different directions, in particular two opposite directions. A pivot axis of the operator control element is preferably arranged horizontally, and pulling upward on the operator control element brings about ventilation of the gas spring and therefore raising of the vehicle seat, and pushing of the operator control element downward brings about venting of the gas spring and therefore lowering of the vehicle seat. Prolonged holding of the operator control element in a direction associated with the lowering of the vehicle seat can bring about complete lowering of the vehicle.

The operator control element is preferably pretensioned toward the neutral position by a force accumulator, and therefore the operator control element does not have to be actively brought back into the neutral position after ventilation or venting by the user. The force accumulator can be a spring. The force accumulator can be a spring which can be pretensioned in two different directions, for example a leg spring or a spiral spring or a tension/compression spring. The force accumulator can alternatively have a plurality of springs, preferably precisely two springs. As a result, two highly cost-effective springs can be used as the force accumulator.

A particularly preferred exemplary embodiment of a height adjusting mechanism according to the invention makes provision for pivoting of the operator control element in the one direction to bring about actuation of a first of two 2/2-way pneumatic valves, and for pivoting of the operator control element in the other direction to bring about actuation of the second 2/2-way pneumatic valve.

The operator control unit of a height adjusting mechanism according to the invention preferably has two connecting links, of which the one connecting link brings about actuation of the one of the two 2/2-way pneumatic valves when the operator control element is pivoted in one direction, and the other connecting link brings about actuation of the other of the two 2/2-way pneumatic valves when the operator control element is pivoted in the other direction. The two connecting links can be fastened to a rocking lever or formed integrally therewith. The rocking lever can be pivotable relative to the valve device. The rocking lever can be mounted pivotably on a housing of the height adjusting mechanism. The housing can be fastenable, in particular screwable, to a structure of a vehicle seat. The operator control lever can be fastened to the rocking lever. Each of the two connecting links can switch an associated pneumatic valve. In this connection, due to an actuation of an operator control element, a preferably wedge-shaped surface of the connecting link pivots a button of the associated pneumatic valve. The button is preferably a valve tappet.

The height adjusting mechanism according to the invention does not have any level control. The valve device is preferably an identical part of an assembly kit for constructing the height adjusting mechanism according to the invention and for constructing a height adjusting mechanism which is known from the prior art and has additional level control. As a result, the valve device is required in a number of units which is composed of the number of units of the height adjusting mechanisms according to the invention and the numbers of units of a height adjusting mechanism which is known from the prior art and has additional level control. The higher overall number of units reduces the individual price since automated manufacturing is better amortized.

In summary and described in other words, the object is achieved as follows: by means of a simple pneumatic valve which is integrated in a height adjusting handle (operator control lever), an air spring (gas spring) is inflated or emptied. The valve is arranged in the handle in the direction of travel and is blocked in the neutral position. Two connecting links are arranged in the height adjusting handle in such a manner that they actuate the valve tappets (buttons) upon rotation of the handle. The valve is thus opened or closed. Via this function, air can be blown into the air spring or let out of the air spring, and therefore the height of the seat can be changed. The height adjusting handle is provided with a spring element in order always to bring it again into the neutral position. The valve is therefore always kept closed in the unactuated state and an escape of air from the air spring is thereby prevented. By means of this concept, an additional rapid lowering function is not necessary since the air spring can be completely emptied by pressing the handle downward for longer in terms of time.

The object is also achieved by a vehicle seat, in particular utility vehicle seat, with a height adjusting mechanism according to the invention. In comparison to vehicle seats known from the prior art, such a vehicle seat requires fewer components. In particular, a level control can be omitted. As a result, a vehicle seat having a cost-effective and simply constructed height adjusting mechanism is provided. A pneumatic utility vehicle seat having simple height adjustment is realized.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5b is a block circuit diagram of the valve device from FIG. 5a;

DESCRIPTION OF THE PREFERRED EMBODIMENTS

Figure 1:
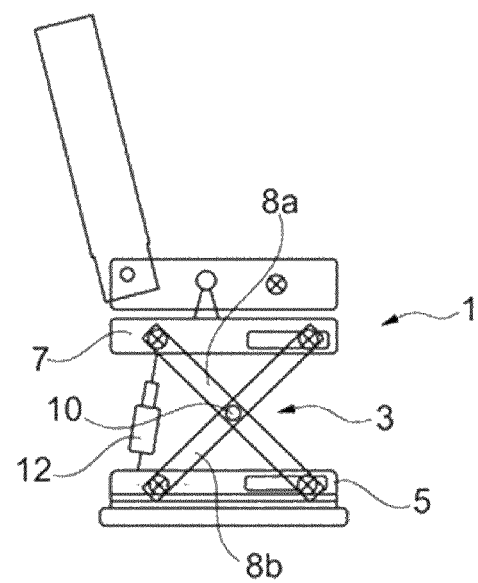
FIG. 1 is a schematic side view of a vehicle seat.

Referring to the drawings, a vehicle seat 1, which is illustrated in FIG. 1, for a utility vehicle or another motor vehicle has a scissors-type frame 3 which comprises a lower frame 5, an upper frame 7 arranged above said lower frame and, on both sides, a respective pair of rockers 8a and 8b which cross over each other. A scissors axis 10 connects the two points of intersection and at the same time defines the axis about which the rockers 8a and 8b can pivot relative to each other. The rockers 8a and 8b are in each case coupled at their rear end to the lower frame 5 or to the upper frame 7 and, at their front end, in each case have rotatable rollers by means of which they are movably guided in or on the upper frame 7 or lower frame 5 in the longitudinal direction of the seat. By means of this movement of the rockers 8a and 8b, the height of the upper frame 7 over the lower frame 5 is altered, denoted in short hereinafter as the height of the scissors-type frame 3. By means of a gas spring 12 and preferably a damper, the scissors-type frame 3 is a rockable system which increases the seating comfort.

Figure 2:
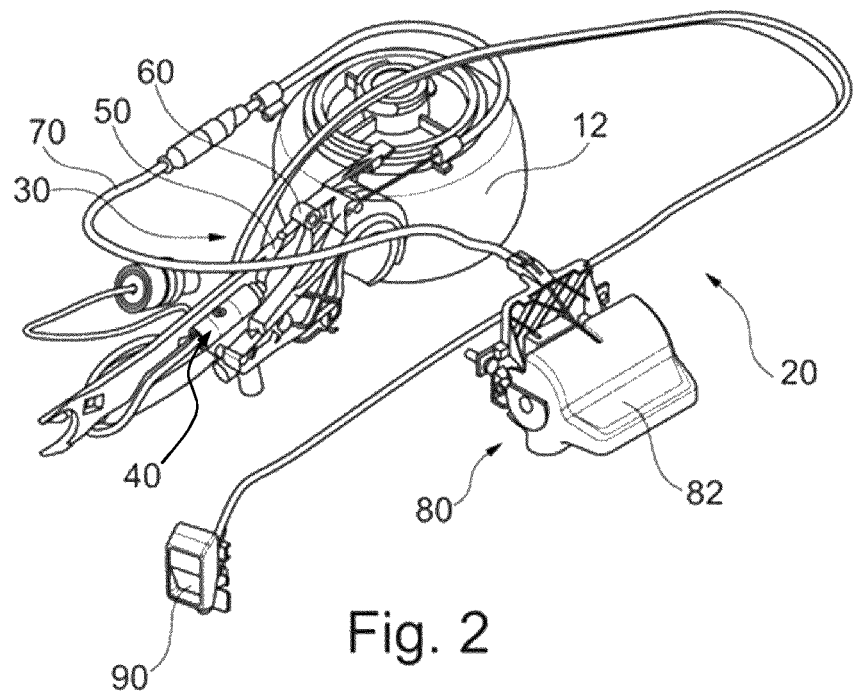
FIG. 2 is a perspective view showing the essential components of a height adjusting mechanism which is known from the prior art and has level control for a vehicle seat with a scissors-type frame.
Figure 3:
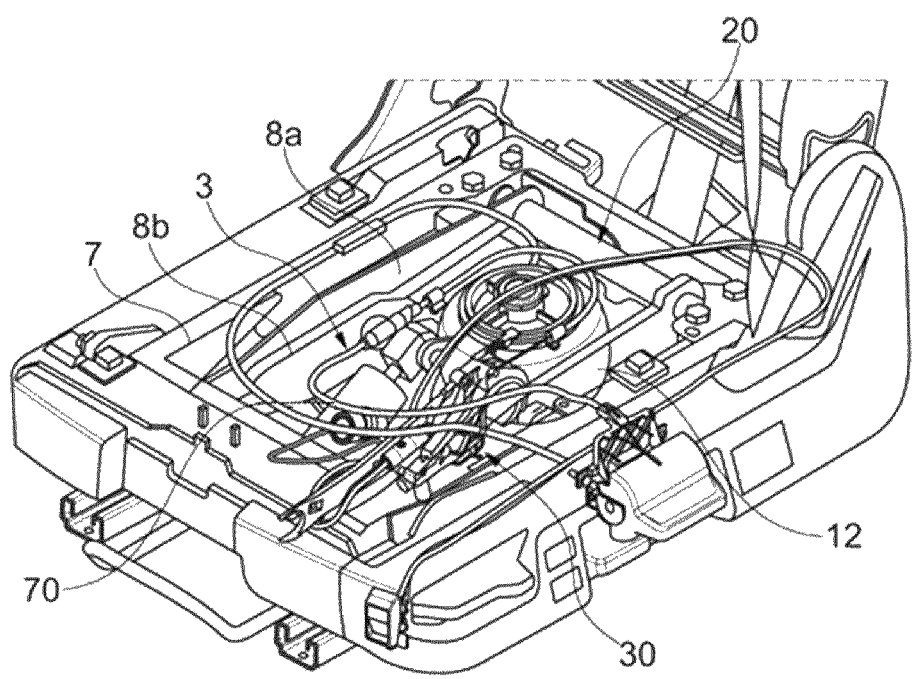
FIG. 3 is a perspective view showing a seat substructure of a vehicle seat with a scissors-type frame and a height adjusting mechanism with level control from FIG. 2 in a completely lowered state.

FIGS. 2 and 3 show the essential components of a height adjusting mechanism which is known from the prior art and has level control 20 for a vehicle seat 1 with a scissors-type frame 3. The construction and the operation of such a height adjusting mechanism with level control is known, for example, from DE 10 2008 013 794 B3, the contents of which in this regard are expressly incorporated herein. This height adjusting mechanism with level control 20 is operated by means of a latching switch 80, which is known from DE 10 2011 014 234 A1, for specifying a desired value of the height of the scissors-type frame 3 and therefore the seat height of the vehicle seat 1.

The height adjusting mechanism which is known from the prior art and has level control 20 for a vehicle seat 1 with a scissors-type frame 3 comprises a gas spring 12 and a control device 30 for level control and for height adjustment of the scissors-type frame 3. The control device 30 comprises a valve device 40 with valves for activating the gas spring 12, a control link 50 and a sensing member 60 for sensing the control link 50, wherein the control link 50 and the sensing member 60 are kinematically assigned to different parts of the scissors-type frame 3 that are moveable relative to one another. The control link 50 and the valve device 40 are kinematically assigned to a first rocker 8a and the sensing member 60 to a second rocker 8b. The control link 50 is arranged pivotably about a pivot axis and in order to actuate the valve device 40. In order to change the height of the scissors-type frame 3 and therefore the seat height, the sensing member 60 is rotated relative to the scissors axis 10 about the scissors axis 10 by means of a cable pull 70, in the present case a Bowden cable. The sensing member 60 thus actuates the control link 50, as a result of which the gas spring 12 is ventilated or vented via the valve device 40 until the desired height is reached.

The rotation of the sensing member 60 by means of the cable pull 70 can take place by means of a latching switch 80. Said latching switch 80 permits the specification of a desired value of the height and comprises a latching track with a plurality of latches, an operator control element which is pivotable about an axis, in the present case an operator control lever 82, and at least one latching element which, by engagement in a latch, fixes the latching switch 80 in a discrete latching position, wherein the at least one latching element is of spring-like design. The latching switch 80 is connected to the sensing member 60 by means of the cable pull 70.

The height adjustment by means of the height adjusting mechanism with level control 20 takes place in a stepped manner. The level control ensures that the adjusted seat height is memorized.

The vehicle seat 1 is optionally equipped with a rapid lowering means 90 which is known per se. The vehicle seat 1 can be rapidly and completely lowered by means of the rapid lowering means 90.

By actuation of the operator control level 82 upward or downward, the control device 30, in the present case the sensing member 60, is adjusted via the cable pull 70. In the present case, the operator control level 82 can latch in 9 different positions. The cable pull 70 which is designed as a Bowden cable adjusts a zero position of the sensing member 60 and opens the valve device 40. By actuation of the valve device 40, air is blown into the gas spring 12 (lifting) or let out therefrom (lowering). The vehicle seat 1 is moved upward or downward until the zero position of the regulator has been reached again. In the zero position, the valve device 40 is blocked and prevents inflation or emptying of the gas spring 12 and therefore keeps the height of the vehicle seat 1 constant. The gas spring 12 is completely emptied via the rapid lowering means 90 and the seat is lowered. As soon as the rapid lowering means 90 is switched off again, the air spring refills and the seat moves into the previously set height position.

Figure 4:
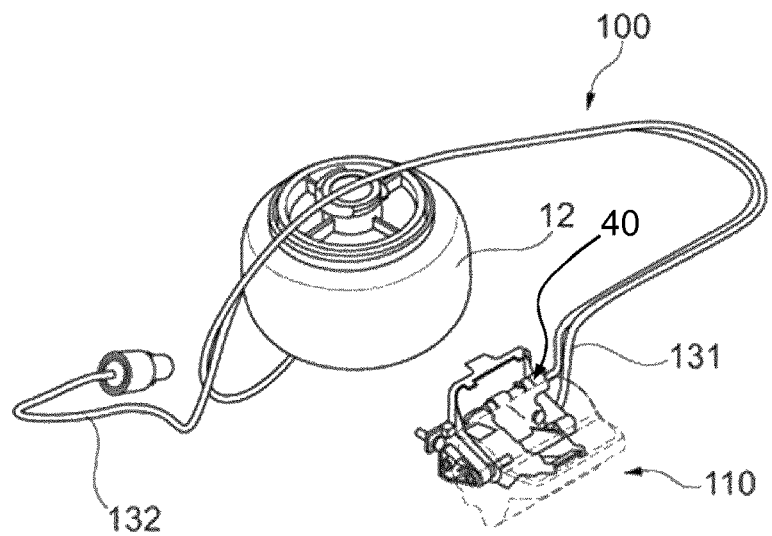
FIG. 4 is a perspective view showing the essential components of a height adjusting mechanism according to the invention for a vehicle seat with a scissors-type frame.

The essential components of a height adjusting mechanism 100 according to the invention for a vehicle seat 1 with a scissors-type frame 3 are illustrated in FIG. 4.

The height adjusting mechanism 100 comprises a gas spring 12, an operator control unit 110 with a valve device 40, a first pneumatic tube 131 and a second pneumatic tube 132.

In a manner known per se, ventilation of the gas spring 12 with air raises the upper frame 7 of the vehicle seat 1. Venting of the gas spring 12, that is to say letting air out of the gas spring 12, leads to lowering of the upper frame 7.

Figure 5A:
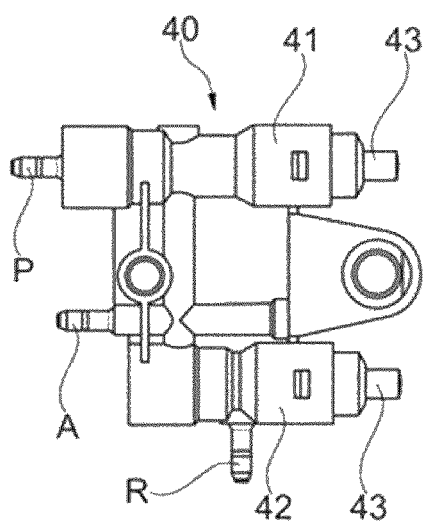
FIG. 5a is a top view of a valve device which is usable as an identical part in the height adjusting mechanism which is known from the prior art and has level control and in the height adjusting mechanism according to the invention.
Figure 5B:
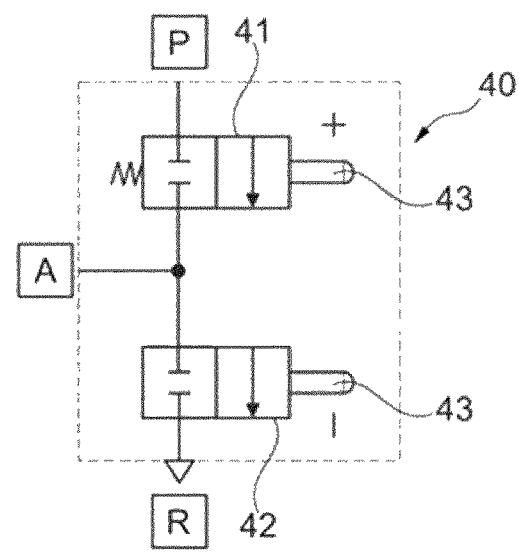
Figure 6:
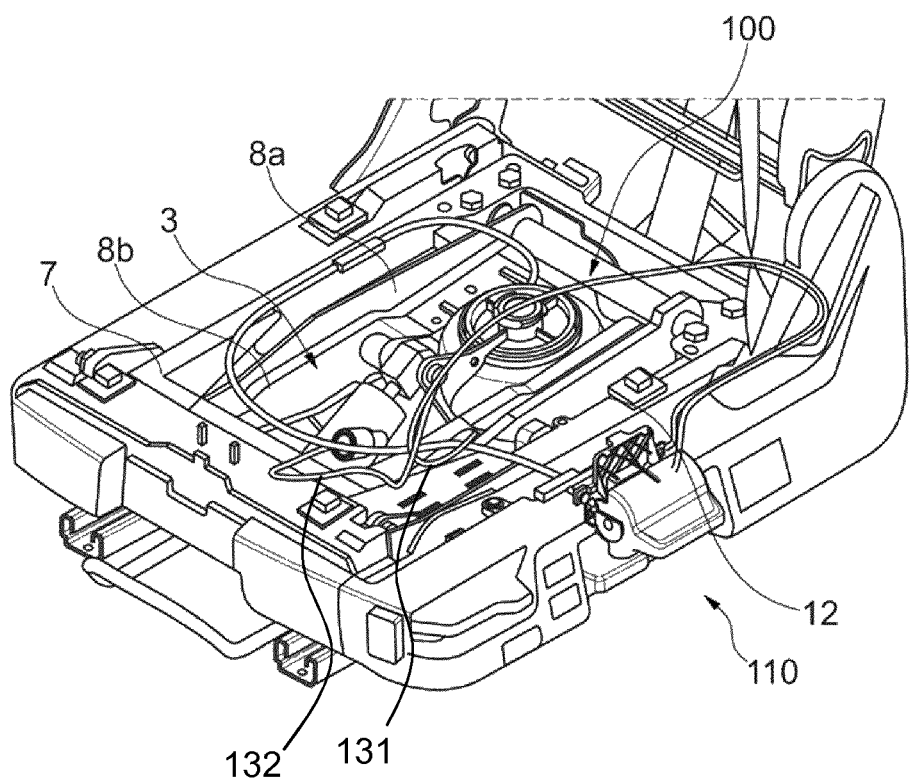
FIG. 6 is a perspective view showing a seat substructure of a vehicle seat with a scissors-type frame and a height adjusting mechanism from FIG. 4 in a completely lowered state.
Figure 7:
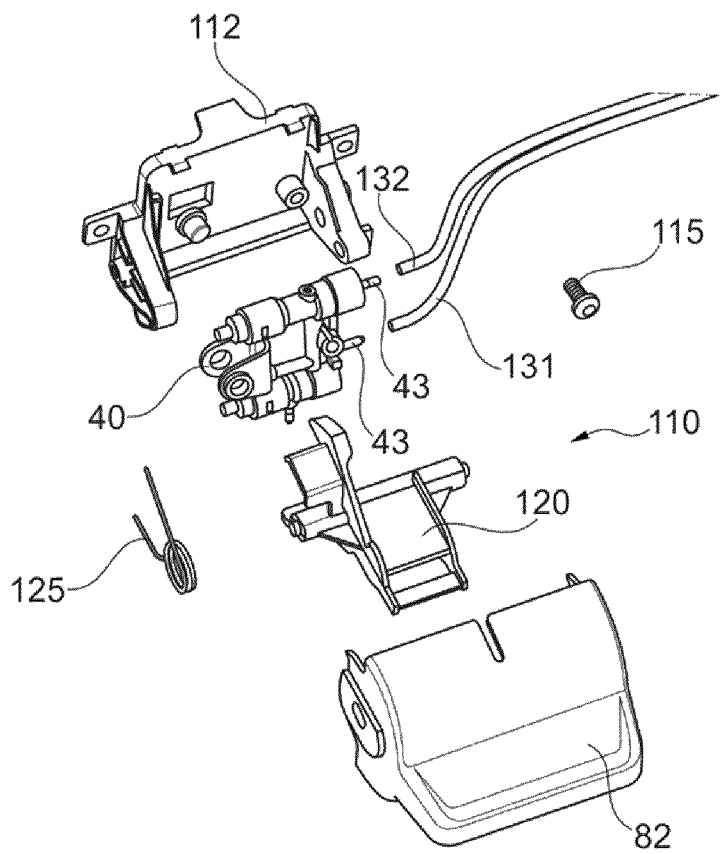
FIG. 7 is an exploded illustration of an operator control unit with an integrated valve device of the height adjusting mechanism according to the invention from FIG. 4.
Figure 8:
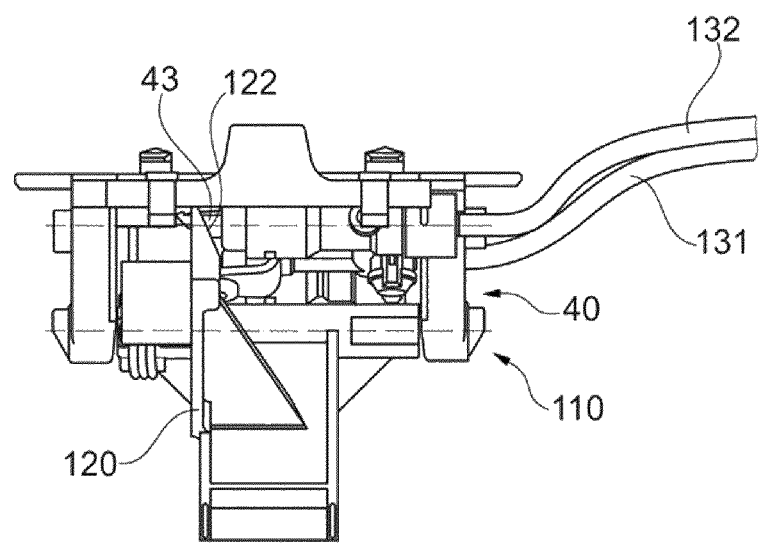
FIG. 8 is a top view of an operator control unit from FIG. 7 in an unactuated state (neutral position)
Figure 9:
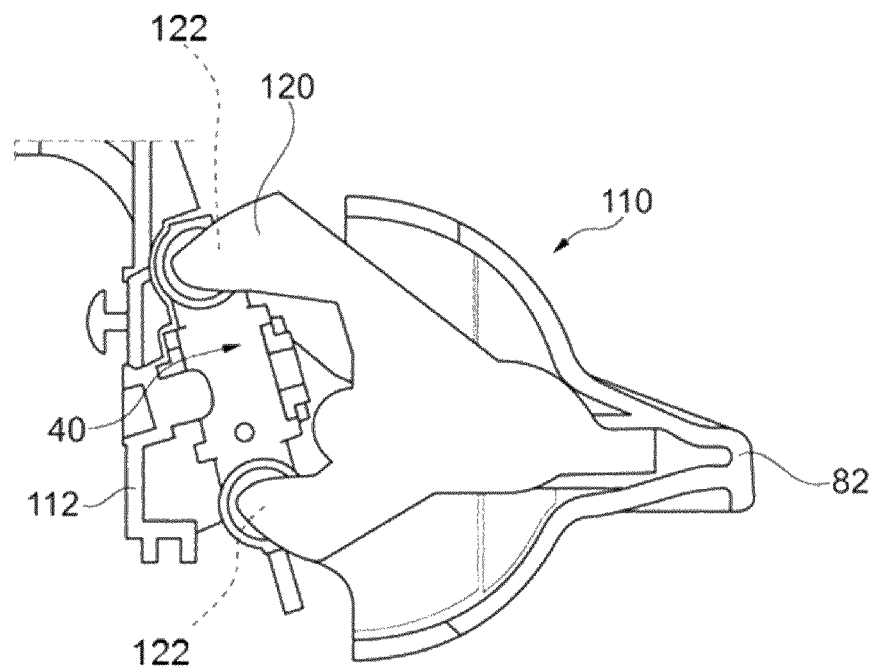
FIG. 9 is a sectional view through the operator control unit from FIG. 7 in an unactuated state (neutral position)
Figure 10:
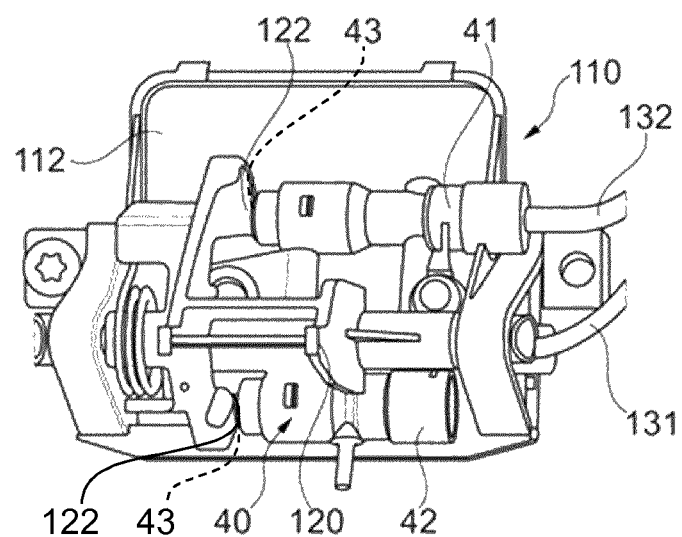
FIG. 10 is a perspective view of the operator control unit from FIG. 7 in an unactuated state (neutral position)
Figure 11:
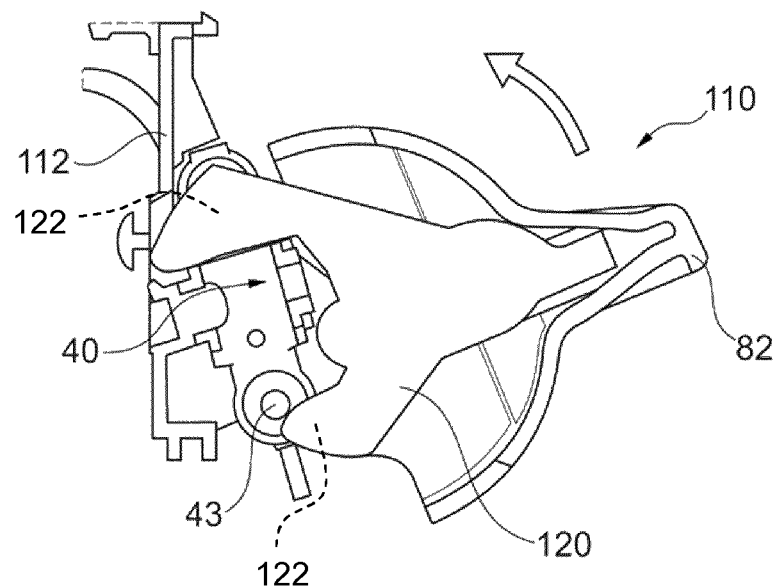
FIG. 11 is a sectional view through the operator control unit from FIG. 7 in a first actuated state for ventilating the gas spring.
Figure 12:
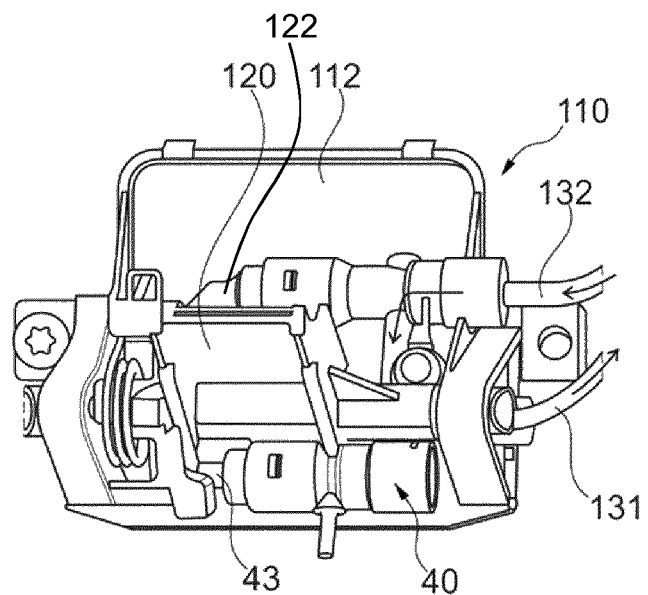
FIG. 12 is a perspective view of the operator control unit from FIG. 7 in a first actuated state for ventilating the gas spring.
Figure 13:
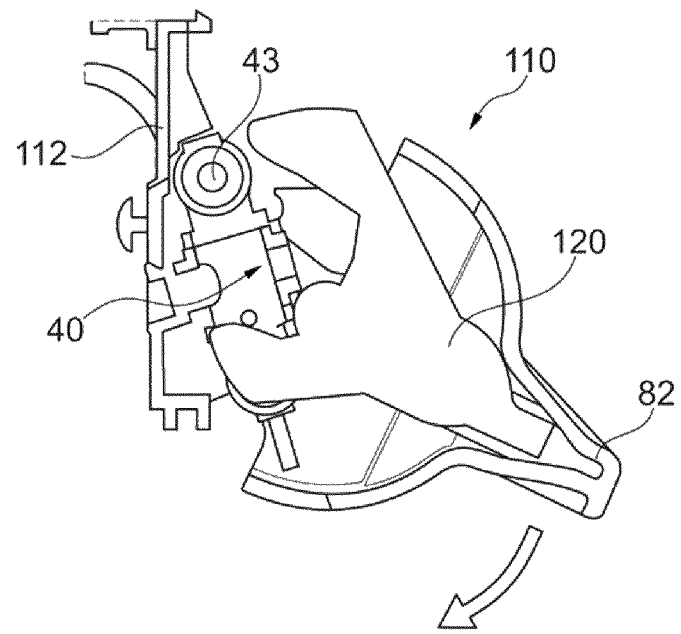
FIG. 13 is a sectional view through the operator control unit from FIG. 7 in a second actuated state for venting the gas spring.
Figure 14:
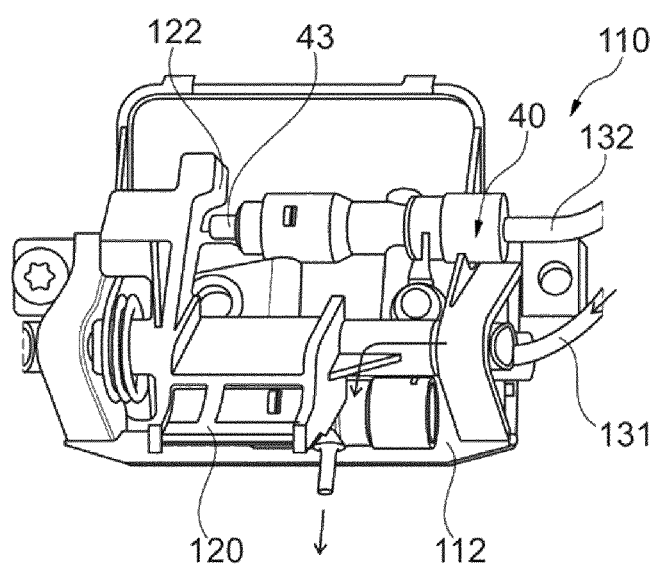
FIG. 14 is a perspective view of the operator control unit from FIG. 7 in a second actuated state for venting the gas spring.

FIGS. 5a and 5b show the valve device 40 in detail. The valve device 40 comprises two 2/2-way pneumatic valves 41, 42. Each of the two pneumatic valves 41, 42 has two connections and two switching positions. In each case precisely one connection of each pneumatic valve 41, 42 are connected to each other and form a common connection A for the first pneumatic tube 131, which serves as what is referred to as a working line. The gas spring 12 is connected to the connection A of the valve device 40 via the first pneumatic tube 131. The gas spring 12 can be ventilated in a corresponding switching position of the first pneumatic valve 41 via the first pneumatic tube 131, that is to say can be filled with a gaseous medium.

A first pneumatic valve 41 of the two pneumatic valves 41, 42 has a connection P for incoming air (compressed air). The connection P is connected to the second pneumatic tube 132 which, for example, is connectable in turn to a compressor or to a pressure accumulator. A second pneumatic valve 42 of the two pneumatic valves 41, 42 has a connection R for outgoing air. The two pneumatic valves 41, 42 can be opened via one button 43 each. In the unactuated state of the valve device 40, the two buttons 43 are unactuated and the two pneumatic valves 41, 42 closed, and therefore air cannot flow through the joint connection A.

Actuation of the button 43 of the first pneumatic valve 41 brings about opening of the first pneumatic valve 41, and therefore incoming air can flow via the first pneumatic valve 41 into the first pneumatic tube 131 and therefore into the gas spring 12, and therefore the gas spring 12 is ventilated. Actuation of the button 43 of the second pneumatic valve 42 brings about opening of the second pneumatic valve 42, so that air of the gas spring 12 can escape via the first pneumatic tube 131 and the second pneumatic valve 42 and the gas spring 12 is thereby vented.

The operator control unit 110 has the valve device 40, a housing 112, a rocking lever 120 and an operator control lever 82.

The housing 112 serves for fastening the operator control unit 110 to the structure of the vehicle seat 1, for example to the upper frame 7. The valve device 40 is screwed to the housing 112 by means of at least one screw 115.

The rocking lever 120 has two connecting links 122 for interaction with one of the two buttons 43 in each case. The rocking lever 120 is mounted rotatably on the housing 112. A spring 125 pretensions the rocking lever 120 into a central, unactuated position (neutral position) in which the two connecting links 122 are spaced apart from the buttons 43. The rocking lever 120 can be pivoted out of the neutral position in two opposite pivoting directions counter to a force of the spring 125. For this purpose, the operator control lever 82 is fastened to the rocking lever 120.

Pivoting of the operator control lever 82 in a first direction, preferably upward, into a first actuated state results in actuation of the first pneumatic valve 41 and correspondingly in filling of the gas spring 12 with air and accordingly in raising of the upper frame 7. The actuation of the first pneumatic valve 41 takes place by one of the two connecting links 122 being pivoted onto the button 43 of the first pneumatic valve 41 and thereby actuating the button 43.

Pivoting of the operator control level 82 in a second direction, preferably downward, into a second actuated state results in actuation of the second pneumatic valve 42 and correspondingly in letting of air out of the gas spring 12 and accordingly in lowering of the upper frame 7. The actuation of the second pneumatic valve 42 takes place by one of the two connecting links 122 being pivoted onto the button 43 of the second pneumatic valve 42 and thereby actuating the button 43.

The upper frame 7 and therefore the vehicle seat 1 moves upward or downward only for as long as the operator control lever 82 is actuated in the respective direction. If the operator control lever 82 is released, the latter is pivoted again into its central position (neutral position) by means of the spring 125. The valve unit 40 is blocked in this neutral position. This prevents air from flowing into the gas spring 12 or prevents air from being able to escape out of the gas spring 12. The vehicle seat 1 maintains its height.

By means of the height adjusting mechanism 100 according to the invention, an additional rapid lowering means is not necessary since the gas spring 12 can be completely emptied by prolonged actuation of the operator control lever 82.

The assembly of the operator control unit 110 preferably takes place on the following steps:
1. Plugging the pneumatic tubes 131, 132 onto the corresponding connections A, P of the valve device 40,
2. Introducing the valve device 40 with the pneumatic tubes 131, 132 into the housing 112 and screwing the valve device 40 to the housing 112,
3. Latching spring 125 and rocking lever 120 (rotatably) in the housing 112,
4. Fixing two legs of the springs 125 into an elongated hole of the housing 112.
5. Mounting the operator control lever 82 onto the rocking lever 120, and
6. Latching the rocking lever 120 onto the housing 112.

The operator control lever 82 and the valve device 40 can preferably be used both for the height adjusting mechanism which is known from the prior art and has level control 20 and for the height adjusting mechanism 100. The operator control lever 82 and the valve device 40 can therefore each be identical parts of an assembly kit.

The features disclosed in the above description, the claims and the drawings may be of significance both individually and also in combination for implementing the invention in its various refinements.

Although the invention has been described in detail in the drawings and the previous illustration, the illustrations should be understood as illustrative and by way of example and non-limiting. In particular, the selection of the graphically illustrated proportions of the individual elements should not be interpreted as required or restricting. Furthermore, the invention is in particular not restricted to the exemplary embodiments explained. Further variants of the invention and the realization thereof are apparent to a person skilled in the art from the above disclosure, the figures and the claims.

Terms such as "comprise", "have", "include", "contain" and the like used in the claims do not exclude further elements or steps. The use of the indefinite article does not exclude a plurality. An individual device can carry out the functions of a plurality of units or devices mentioned in the claims.

While specific embodiments of the invention have been shown and described in detail to illustrate the application of the principles of the invention, it will be understood that the invention may be embodied otherwise without departing from such principles.

The invention claimed is:

1. A height adjusting mechanism for a vehicle seat, wherein the vehicle seat has a scissors frame, the height adjusting mechanism comprising:
   a gas spring interacting with the scissors frame;
   an operator control unit; and
   a valve device for ventilating and venting the gas spring, wherein the valve device is arranged on the operator control unit, and the operator control unit has an operator control element actuating the height adjusting mechanism, the valve device being part of the operator control unit, the valve device being arranged within the operator control unit, the valve device comprising two 2/2-way pneumatic valves.

2. The height adjusting mechanism as claimed in claim 1, wherein actuation of one of the two 2/2-way pneumatic valves brings about ventilation of the gas spring and actuation of the other of the two 2/2-way pneumatic valves brings about venting of the gas spring.

3. The height adjusting mechanism as claimed in claim 1, wherein, in an unactuated state of the operator control element, the operator control element is in a neutral position and the valve unit is blocked.

4. The height adjusting mechanism as claimed in claim 3, wherein the operator control element is pretensioned toward the neutral position by a force accumulator comprised of a spring.

5. The height adjusting mechanism as claimed in claim 3, wherein the operator control element is movable out of the neutral position in two different directions.

6. The height adjusting mechanism as claimed in claim 2, wherein pivoting of the operator control element in the one direction brings about actuation of the one of the two 2/2-way pneumatic valves, and pivoting of the operator control element in the other direction brings about actuation of the other of the two 2/2-way pneumatic valves.

7. The height adjusting mechanism as claimed in claim 6, wherein the operator control unit has two connecting links, of which the one connecting link brings about opening of the one of the two 2/2-way pneumatic valves when the operator control element is pivoted in the one direction, and the other connecting link brings about opening of the other of the two 2/2-way pneumatic valves when the operator control element pivots in the other direction.

8. The height adjusting mechanism as claimed in claim 7, wherein the two 2/2-way pneumatic valves are configured to be opened independently of each other by means of a button, wherein the two connecting links are spaced apart from the two buttons in the neutral position, and, when the operator control element is pivoted out of the neutral position in the one direction, one of the two connecting links actuates one of the two buttons, and, when the operator control element is pivoted out of the neutral position in the other direction, the other of the two connecting links actuates the other of the two buttons.

9. The height adjusting mechanism as claimed in claim 1, wherein the valve device is an identical part of an assembly kit for constructing the height adjusting mechanism and has additional level control.

10. The height adjusting mechanism as claimed in claim 1, wherein the common connection and the inlet are parallel to a longitudinal direction of the operator control unit housing, the outlet being arranged in a position transverse to the longitudinal direction.

11. A vehicle seat comprising:
a vehicle seat frame; and
a height adjusting mechanism comprising:
a gas spring interacting with the vehicle seat frame;
an operator control unit; and
a valve device ventilating and/or venting the gas spring, wherein the valve device is arranged on the operator control unit, and the operator control unit has an operator control element actuating the height adjusting mechanism, the valve device being part of the operator control unit, the valve device being arranged within the operator control unit, the valve device comprising two 2/2-way pneumatic valves.

12. The vehicle seat as claimed in claim 11, wherein the vehicle seat is a utility vehicle seat.

13. The vehicle seat as claimed in claim 11, wherein the vehicle seat frame comprises a scissors frame and the gas spring interacts with the scissors frame.

14. The vehicle seat as claimed in claim 11, wherein actuation of one of the two 2/2-way pneumatic valves brings about ventilation of the gas spring and actuation of the other of the two 2/2-way pneumatic valves brings about venting of the gas spring.

15. The vehicle seat as claimed in claim 14, wherein:
pivoting of the operator control element in the one direction brings about actuation of the one of the two 2/2-way pneumatic valves, and pivoting of the operator control element in the other direction brings about actuation of the other of the two 2/2-way pneumatic valves; and
the operator control unit has two connecting links, of which the one connecting link brings about opening of the one of the two 2/2-way pneumatic valves when the operator control element is pivoted in the one direction, and the other connecting link brings about opening of the other of the two 2/2-way pneumatic valves when the operator control element pivots in the other direction.

16. The vehicle seat as claimed in claim 11, wherein:
in an unactuated state of the operator control element, the operator control element is in a neutral position and the valve unit is blocked; and
the operator control element is pretensioned toward the neutral position by a force accumulator comprised of a spring.

17. A height adjusting mechanism for a vehicle seat, wherein the vehicle seat has a scissors frame, the height adjusting mechanism comprising:
a gas spring interacting with the scissors frame;
an operator control unit comprising an operator control unit housing, the operator control unit housing comprising an operator control unit interior; and
a valve device for ventilating and venting the gas spring, wherein the valve device is arranged on the operator control unit, and the operator control unit has an operator control element actuating the height adjusting mechanism, the valve device being arranged in the operator control unit interior, the valve device comprising two 2/2-way pneumatic valves.

18. The height adjusting mechanism as claimed in claim 17, wherein the plurality of 2/2-way pneumatic valves are connected to each other and form a common connection for a first pneumatic tube, wherein the common connection is configured to deliver fluid to the gas spring, one of the plurality of 2/2-way pneumatic valves comprising an inlet for receiving compressed fluid, another one of the plurality of 2/2-way pneumatic valves comprising an outlet for exiting fluid.

19. The height adjusting mechanism as claimed in claim 18, wherein the common connection and the inlet are parallel to each other.

20. The height adjusting mechanism as claimed in claim 19, wherein the outlet is perpendicular to the common connection and the inlet.

* * * * *